United States Patent
Takeda et al.

(10) Patent No.: US 7,379,798 B2
(45) Date of Patent: May 27, 2008

(54) BICYCLE DISPLAY APPARATUS WITH DISTRIBUTED PROCESSING

(75) Inventors: Kazuhiro Takeda, Sakai (JP); Haruyuki Takebayashi, Yao (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 121 days.

(21) Appl. No.: 10/708,341

(22) Filed: Feb. 25, 2004

(65) Prior Publication Data
US 2004/0172178 A1    Sep. 2, 2004

(30) Foreign Application Priority Data
Feb. 27, 2003   (JP) .............. 2003-050871

(51) Int. Cl.
*A63B 34/00* (2006.01)
*B62J 39/00* (2006.01)

(52) U.S. Cl. .............. 701/29; 701/33; 701/35; 340/427; 340/432

(58) Field of Classification Search ........... 701/29, 701/31, 1, 35, 33, 51; 340/432, 427; 482/57; 474/116; 74/502.2; 280/200; 116/28 R
See application file for complete search history.

(56) References Cited

U.S. PATENT DOCUMENTS

| | | | |
|---|---|---|---|
| 4,071,892 A | | 1/1978 | Genzling |
| 4,319,129 A * | | 3/1982 | Quintilian .............. 235/97 |
| 4,435,983 A | | 3/1984 | Shimano |
| 5,059,158 A | | 10/1991 | Bellio et al. |
| 5,577,969 A | | 11/1996 | Watarai |
| 5,629,668 A * | | 5/1997 | Downs ............... 340/432 |
| 6,192,300 B1 | | 2/2001 | Watarai et al. |
| 6,328,268 B1 * | | 12/2001 | Irie ................ 248/230.1 |
| 6,388,871 B1 * | | 5/2002 | Masui ................ 361/683 |
| 6,418,041 B1 * | | 7/2002 | Kitamura .............. 363/125 |
| 6,430,040 B1 | | 8/2002 | Masui |
| 6,446,922 B2 * | | 9/2002 | Irie ................ 248/230.1 |
| 6,492,963 B1 * | | 12/2002 | Hoch ................ 345/39 |
| 6,741,045 B2 * | | 5/2004 | Kitamura .............. 318/14 |
| 6,757,567 B2 * | | 6/2004 | Campagnolo et al. ....... 700/2 |
| 7,184,872 B2 * | | 2/2007 | Guderzo .............. 701/51 |

(Continued)

FOREIGN PATENT DOCUMENTS

DE    10037377 A1    2/2002

(Continued)

OTHER PUBLICATIONS

Learoyd, Cyclometer Errors Caused by Magnet Orientation, from http://sheldonbrown.com/cyclecomputer-magnet.html, 5 pages copyrighted 2000.*

(Continued)

*Primary Examiner*—Cuong Nguyen
(74) *Attorney, Agent, or Firm*—James A. Deland

(57) ABSTRACT

A bicycle display apparatus comprises a computing component and a separate display component. The computing component is structured for attachment to the bicycle, calculates cumulative information produced from a bicycle-related running condition, and includes an information output for outputting the calculated cumulative information. The display component includes an information input that receives the cumulative information calculated by the computing component, and the display component displays the cumulative information calculated by the computing component.

27 Claims, 9 Drawing Sheets

U.S. PATENT DOCUMENTS

| | | |
|---|---|---|
| 2001/0027495 A1 | 10/2001 | Campagnolo |
| 2004/0108680 A1* | 6/2004 | Guderzo et al. ............. 280/260 |
| 2004/0110585 A1* | 6/2004 | Guderzo et al. .............. 474/70 |
| 2004/0172178 A1* | 9/2004 | Takeda et al. ................ 701/29 |
| 2004/0220712 A1* | 11/2004 | Takeda et al. ................ 701/35 |

FOREIGN PATENT DOCUMENTS

| | | |
|---|---|---|
| EP | 696737 A1 | 2/1996 |
| EP | 1384659 A2 | 1/2004 |
| EP | 1391375 A1 | 2/2004 |
| JP | 4-325387 A | 11/1992 |
| JP | 7-96877 A | 4/1995 |
| JP | 8-301172 A | 11/1996 |
| JP | 10-40 U | 2/1998 |
| JP | 2000-131090 A | 5/2000 |

OTHER PUBLICATIONS

Brown, Cyclecomputer Troubleshooting, Harris cyclery, edited Nov. 23, 2001 (from http://sheldonbrown.com/cyclecomputer-troubleshoot.html).*

* cited by examiner

BICYCLE DISPLAY APPARATUS WITH DISTRIBUTED PROCESSING

BACKGROUND OF INVENTION

The present invention is directed to bicycles and, more particularly, to a bicycle display apparatus with distributed processing.

Cycle computers typically calculate and display travel information such as the bicycle velocity, travel distance, total distance, and so on. Such a cycle computer is shown in Japanese Unexamined Patent Application (Kokai) 2000-16367. More specifically, cycle computers typically comprise a display control component having a microcomputer that is operated by power supplied from an internally mounted battery, a liquid crystal display (LCD) component for displaying the travel information, and mode buttons for various types of input and control functions. A conventional rotation sensor comprising a reed switch mounted on the bicycle frame and a magnet mounted on a wheel is operatively coupled with or without wires to the display control component, and the display control component computes the velocity, total distance, or travel distance based on electrical pulses from the rotation sensor.

Total distance is commonly referred to as distance traveled by the bicycle from the beginning of travel after the display has been mounted on the bicycle (or master reset) until the present, and it may be computed by counting pulses from the rotation sensor since that time. Travel distance is commonly referred to as distance traveled by the bicycle from the point at which a device referred to as a trip meter is reset, and it may be computed by counting pulses from the rotation sensor since the trip meter was reset. The computed total distance and travel distance are stored in a memory inside the microcomputer and selectively displayed as desired by the rider.

Some cycle computer display control components are designed to be detachable in order to prevent theft and to allow the display control component to be replaced separately without replacing the entire cycle computer. However, that means the total distance or travel distance is not calculated when the display control component is taken off during travel to prevent theft during rest stops or the like and the rider forgets to put the device back on when traveling resumes. In any event, total distance also cannot be carried over to replacement display control components when such components are replaced due to microcomputer malfunctions or the like. As a result, the total distance is not accurately displayed when the display control component is replaced.

SUMMARY OF INVENTION

The present invention is directed to various features of a bicycle display apparatus. In one embodiment, a bicycle display apparatus comprises a computing component and a separate display component. The computing component is structured for attachment to the bicycle, calculates cumulative information produced from a bicycle-related running condition, and includes an information output for outputting the calculated cumulative information. The display component includes an information input that receives the cumulative information calculated by the computing component, and the display component displays the cumulative information calculated by the computing component. Such a structure allows the cumulative information to be properly displayed even when the display component is temporarily detached or replaced. Additional inventive features will become apparent from the description below, and such features alone or in combination with the above features may form the basis of further inventions as recited in the claims and their equivalents.

DETAILED DESCRIPTION

Figure 1:
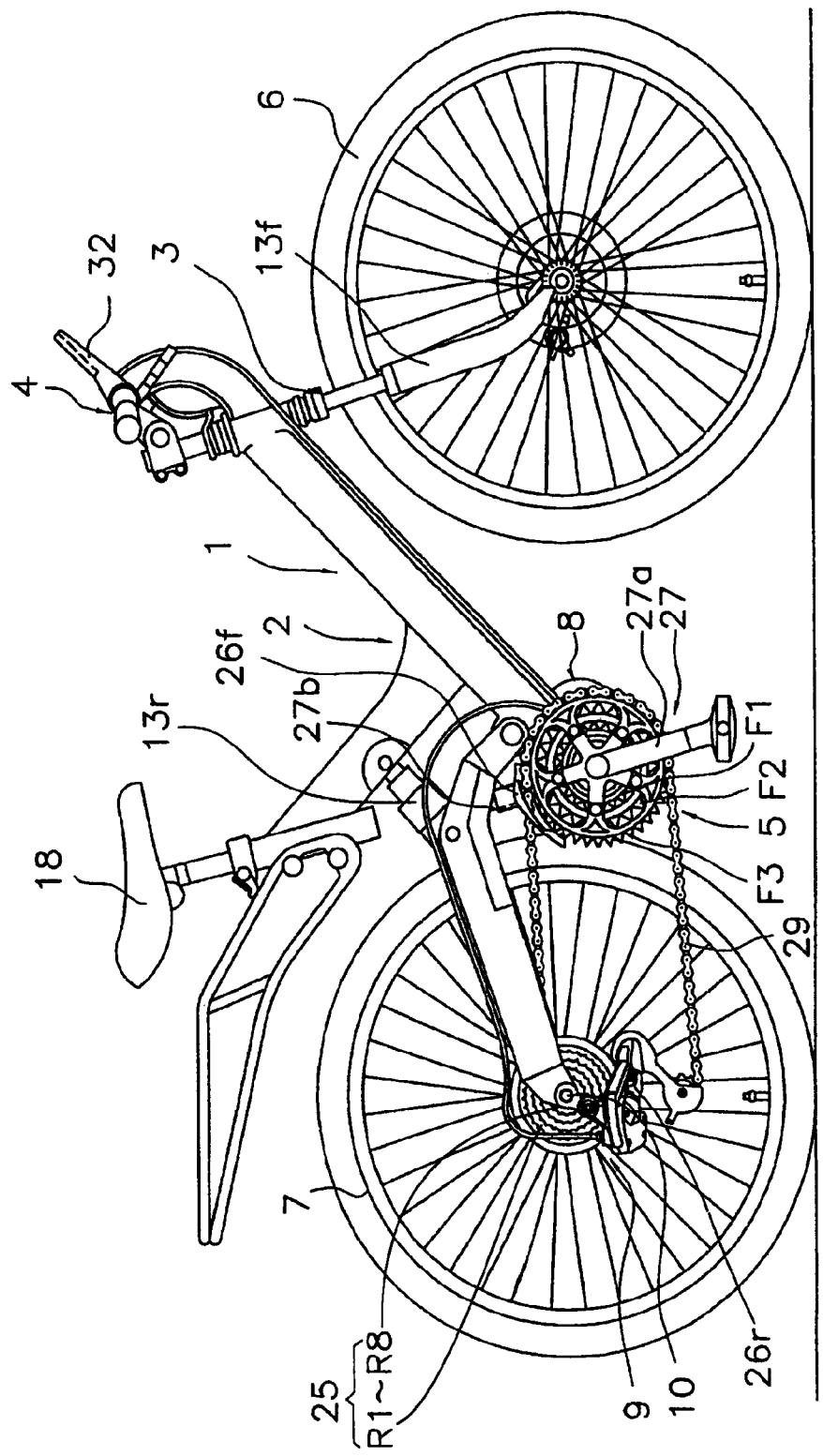
FIG. 1 is a side view of a particular embodiment of a bicycle.

FIG. 1 is a side view of a particular embodiment of a bicycle 1. Bicycle 1 comprises a frame body 2 constructed by welding together tubing having noncircular cross-sections. A front fork 3 is mounted to the front of frame body 2 for rotation around an inclined axis, and a handlebar assembly 4 is mounted to the top of front fork 3. A saddle 18 is mounted to the upper middle part of frame body 2, a drive mechanism 5 is mounted to the lower part of frame body 2, a front wheel 6 is rotatably mounted to the bottom of front fork 3, and a rear wheel 7 having a hub dynamo 10 is rotatably mounted to the rear of frame body 2. Hub dynamo 10 houses an alternating current generator 19 (FIG. 3) for generating electricity through rotation of rear wheel 7. A front transmission 8 including a front derailleur 26f is mounted to the lower middle part of frame body 2, and a rear transmission 9 including a rear derailleur 26r is mounted to the rear of frame body 2. A front suspension 13f is mounted to front fork 3, and a rear suspension 13r is mounted between stationary and articulated portions of frame body 2.

Figure 2:
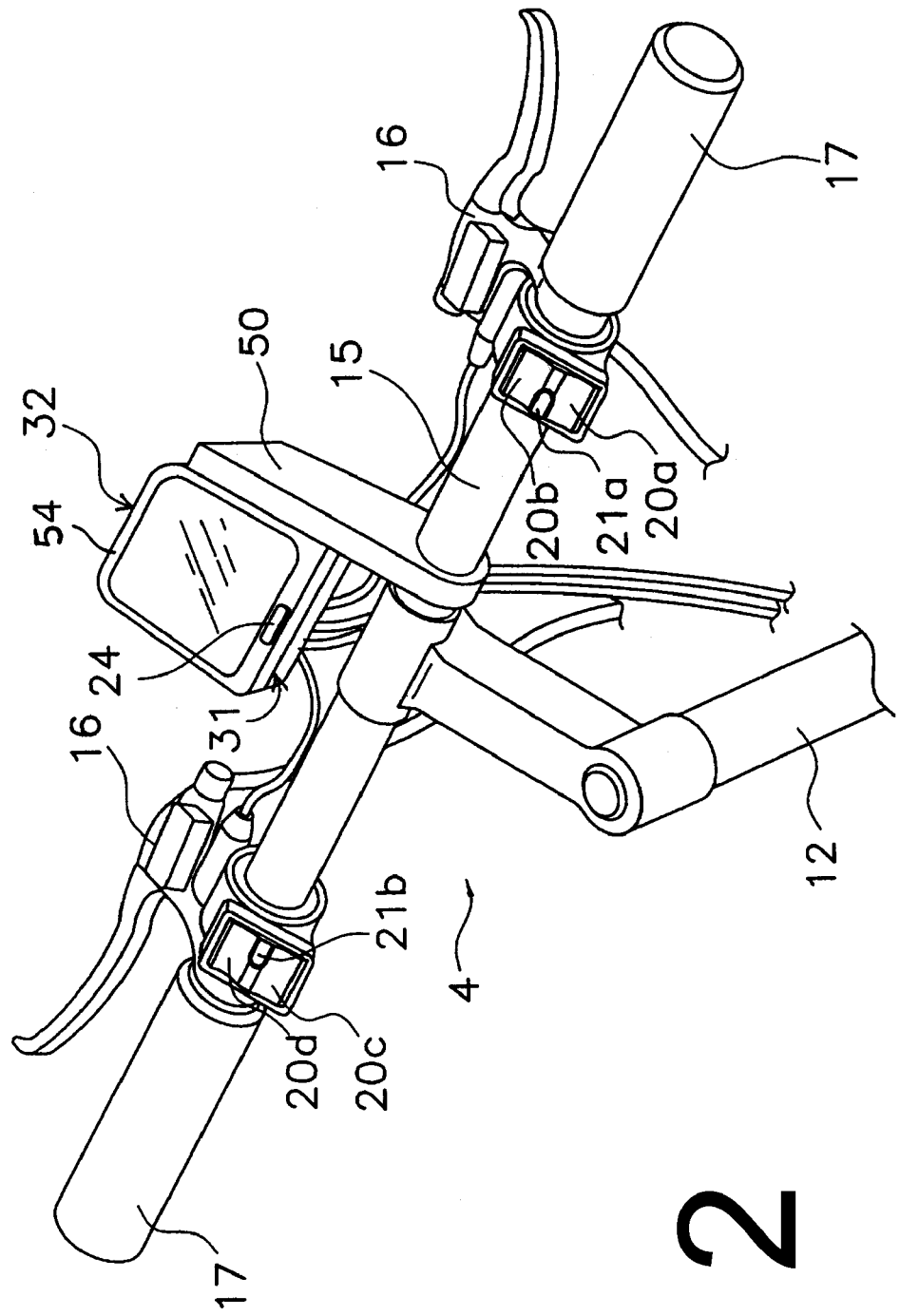
FIG. 2 is a more detailed view the handlebar assembly.

As shown in FIG. 2, handlebar assembly 4 comprises a handle stem 12 mounted to the top of front fork 3 and a handlebar 15 mounted to the top of handle stem 12. Brake lever assemblies 16 and grips 17 are mounted at the opposite ends of handlebar 15. The right side brake lever assembly 16 includes a rear downshift switch 20a for manually downshifting rear derailleur 26r in single increments, a rear upshift switch 20b for manually upshifting rear derailleur 26r in single increments, and a mode switch 21a for switching between automatic and manual shift modes. The left side brake lever assembly 16 includes a front downshift switch 20c for manually downshifting front derailleur 26f in single increments, a front upshift switch 20d for manually upshifting front derailleur 26f in single increments, and a suspension control switch 21b for adjusting the stiffness of front suspension 13f and rear suspension 13r.

As shown in FIG. 1, drive mechanism 5 comprises a crank 27 rotatably mounted at the bottom bracket of frame body 2, front and rear transmissions 8 and 9, and a chain 29. Front transmission 8 comprises, for example, three front sprockets F1-F3 and front derailleur 26f. Front sprockets F1-F3 are mounted to crank 27, and front derailleur 26f is mounted on frame body 2. Rear transmission 9 comprises, for example, a multiple sprocket assembly 25 having eight rear sprockets R1-R8 and rear derailleur 26r. Multiple sprocket assembly 25 is mounted to rear wheel 7 and rear derailleur 26r is mounted at the back of frame body 2. Crank 27 comprises a right crank arm 27a and a left crank arm 27b, wherein front sprockets F1-F3 are mounted to right crank arm 27a. Chain 29 engages one of the front sprockets F1-F3 and one of the rear sprockets R1-R8.

Front sprockets F1-F3 are arranged in the order of an increasing number of teeth, wherein front sprocket F1 is the laterally innermost front sprocket having the least number of teeth, and front sprocket F3 is the laterally outermost front sprocket having the most number of teeth. Rear sprockets R1-R8 are arranged in the order of a decreasing number of teeth, wherein rear sprocket R1 is the laterally innermost rear sprocket having the most number of teeth, and rear sprocket R8 is the laterally outermost rear sprocket having the least number of teeth.

A rotation sensor (not shown in FIG. 1) is provided for sensing the rotation of crank 27. The presence or absence of rotation of crank 27 ordinarily is used in part to control the operation of front and rear transmissions 8 and 9. For example, derailleurs cannot shift properly when crank 27 is stationary, so any requested operation of a derailleur may be delayed until crank 27 is rotating. A rotation sensor typically comprises a reed switch 23 (FIG. 3) mounted to frame body 2 and a magnet (not shown) mounted to one of the crank arms 27a and 27b so that reed switch 23 provides a pulse whenever the magnet passes by.

A controller 11 (FIG. 3) is provided for controlling various components including the front and rear transmissions 8 and 9 and the front and rear suspensions 13f and 13r. More specifically, controller 11 controls front and rear transmissions 8 and 9 in response to the operation of shift switches 20a-20d and mode switch 21a, and it controls front and rear suspensions 13f and 13r in response to the operation of control switch 21b. Controller 11 also automatically controls the operation of front and rear transmissions 8 and 9 in response to bicycle velocity.

Figure 3:
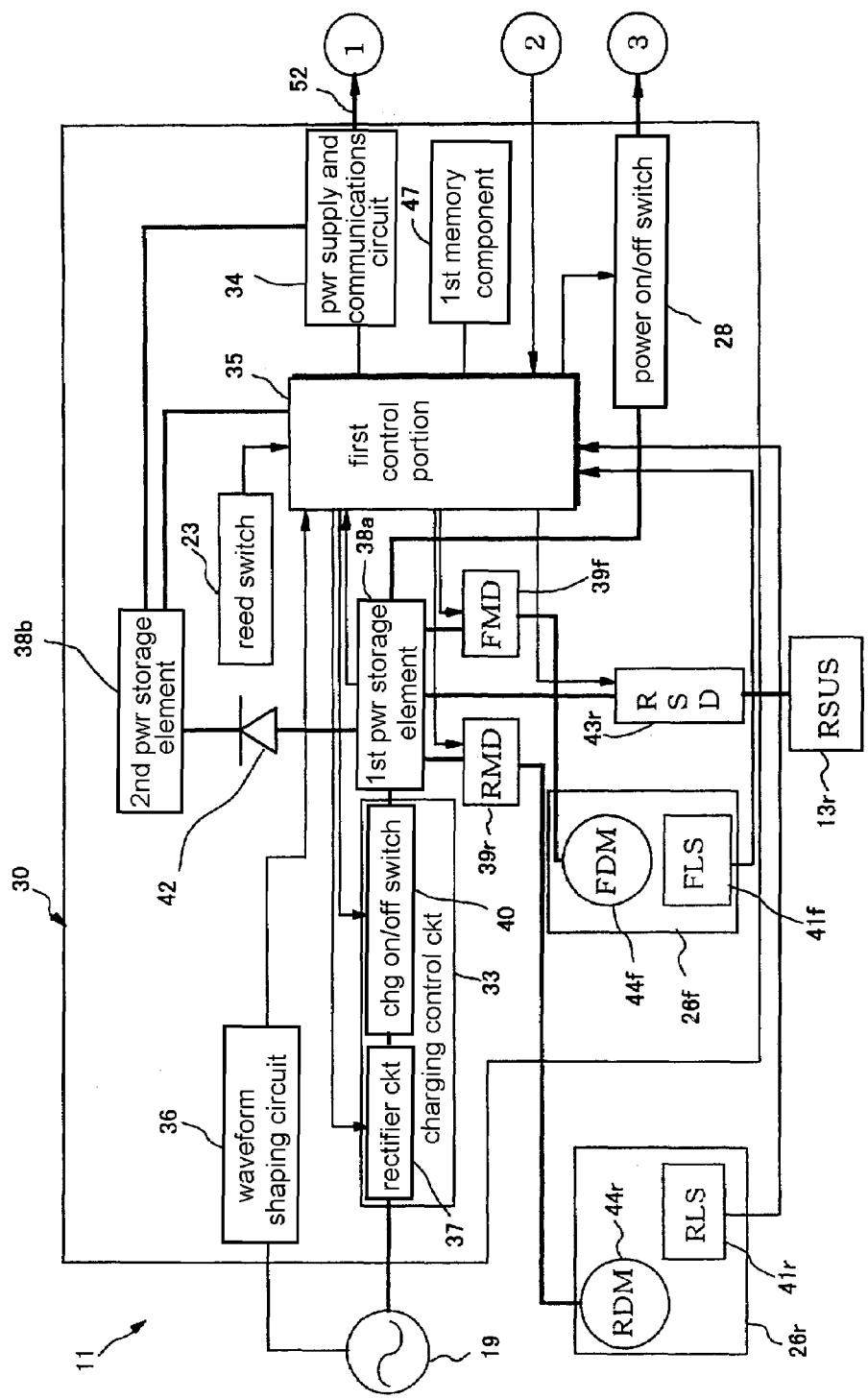
FIGS. 3 and 4 are schematic block diagrams of a computer control device for components of the bicycle.
Figure 4:
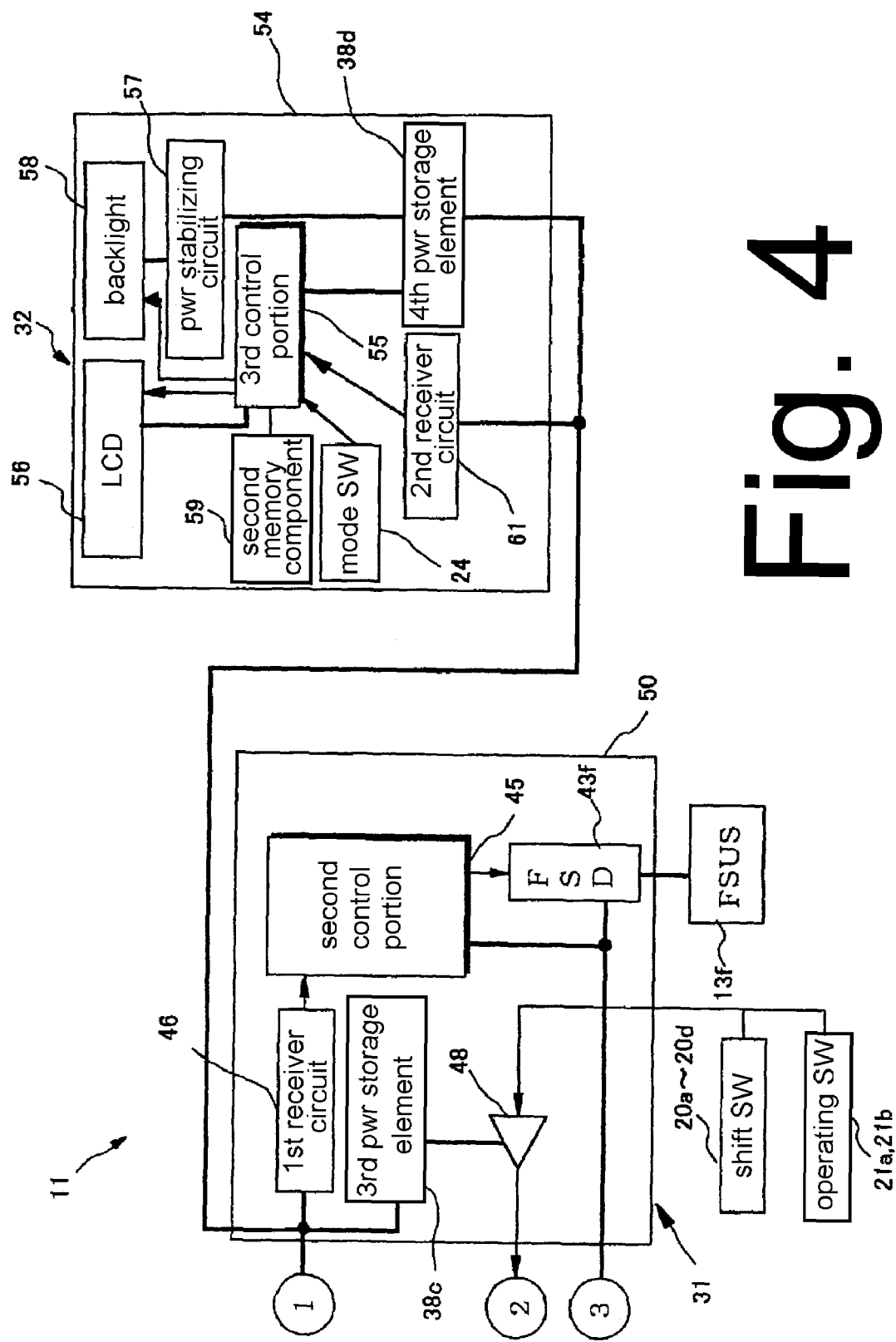

As shown in FIGS. 3 and 4, controller 11 comprises a first control unit 30, a second control unit 31, and a third control unit 32. First control unit 30 may be mounted, for example, on the bottom bracket of frame body 2 in proximity to the rotation sensor and front derailleur 26f, and it is connected to alternating current generator 19. The electrical current generated by alternating current generator 19 powers first control unit 30, and first control unit 30 uses the supplied electrical current to control the operation of front derailleur 26f, rear derailleur 26r and rear suspension 13r. First control unit 30 also supplies control signals (e.g., a velocity signal) superimposed on a relatively low current signal (e.g., pulse code modulated (PCM) signals) to second control unit 31 and third control unit 32. Since first control unit 30 is disposed on the bottom bracket of frame body 2, it is fairly close to alternating current generator 19. As a result, a short power cable may be used to connect first control unit 30 to alternating current generator 19, and the communication of power between the two may be carried out with high efficiency.

First control unit 30 controls front transmission 8, rear transmission 9 and rear suspension 13r in accordance with the operating mode set by mode switch 21a. In this embodiment, in automatic mode, front transmission 8 and rear transmission 9 are controlled according to bicycle velocity, and rear suspension 13r may be set in one of two levels (e.g., hard or soft) depending on bicycle velocity. In manual mode, rear transmission 9 is controlled by the operation of shift switches 20a and 20b, front transmission 8 is controlled by the operation of shift switches 20c and 20d, and rear suspension 13r is controlled by the operation of control switch 21b.

First control unit 30 has a first control portion 35 that comprises a computing component in the form of a microcomputer including a CPU, memory, I/O interface, and the like. A number of modules are connected to first control portion 35. Such modules include a waveform shaping circuit 36 for generating a velocity signal from pulses output from alternating current generator 19; a charging control circuit 33; a first power storage element 38a; a second power storage element 38b; the rotation sensor reed switch 23; a power supply and communications circuit 34 that switches on and off a relatively low current signal from second power storage element 38b to second control unit 31 and third control unit 32 and provides the composite power/control PCM signals mentioned above to second control unit 31 and third control unit 32; a power on/off switch 28 that switches on and off a relatively high current signal from first power storage element 38a to second control unit 31; a front motor driver (FMD) 39f for operating a front derailleur motor (FDM) 44f for front derailleur 26f; a rear motor driver (RMD) 39r for operating a rear derailleur motor (RDM) 44r for rear derailleur 26r; a front operating location sensor (FLS) 41f for front derailleur 26f; a rear operating location sensor (RLS) 41r for rear derailleur 26r; a rear suspension driver (RSD) 43r for operating rear suspension 13r; and a first memory component 47 for storing travel information such as total distance (in which case it functions as a cumulative information memory) and so on. First memory component 47 may comprise a nonvolatile memory such as an EEPROM for retaining the data stored therein even when the power source is interrupted.

Second control unit 31 controls front suspension 13f in response to control signals sent by first control unit 30. More specifically, in automatic mode the hardness of front suspension 13f is adjusted depending on bicycle velocity, whereas in manual mode the hardness of front suspension 13f is adjusted in response to the operation of control switch 21b. Second control unit 31 also provides control information from switches 20a-20d, 21a and 21b to first control unit 30. For these functions, second control unit 31 includes a third power storage element 38c, a front suspension driver (FSD) 43f for operating front suspension 13f, a second control portion 45 such as a computing component in the form of a microcomputer, a first receiver circuit 46 for receiving composite power/control signals from power supply and communications circuit 34 in first control unit 30, and a buffer 48. As shown in FIG. 2, second control unit 31 is attached to handlebar 15 of handlebar assembly 4 by means of a bracket 50, with the components of second control unit 31 housed within bracket 50.

Third control unit 32 is housed in a case member 54 detachably installed on second bracket 50, and it functions primarily as a display component. Third control unit 32 has a liquid crystal display (LCD) 56 that displays travel information such as bicycle velocity, cadence, distance traveled, shift position, suspension status, and other information. Third control unit 32 controls LCD 56 in response to control signals output by first control unit 30. For that purpose, third control unit 32 also includes a fourth power storage element 38d, a third control portion 55 such as a computing component in the form of a microcomputer, a voltage stabilizing circuit 57, a backlight 58 for illuminating display 56, a second memory component 59, and a second receiver circuit 61 for receiving composite power/control signals from power supply and communications circuit 34 in first control unit 30. A mode switch 24 protrudes outward from case member 54 as shown in FIG. 2 and provides signals to third control portion 55 to select the types of information displayed on LCD 56 (in which case mode switch 24 functions as a display switching component). Mode switch 24 also may be used to reset travel distance (i.e., begin calculating travel distance anew) such as by depressing mode switch 24 for a selected time interval (e.g., 3 seconds or longer), and to perform other control functions.

Figure 9:
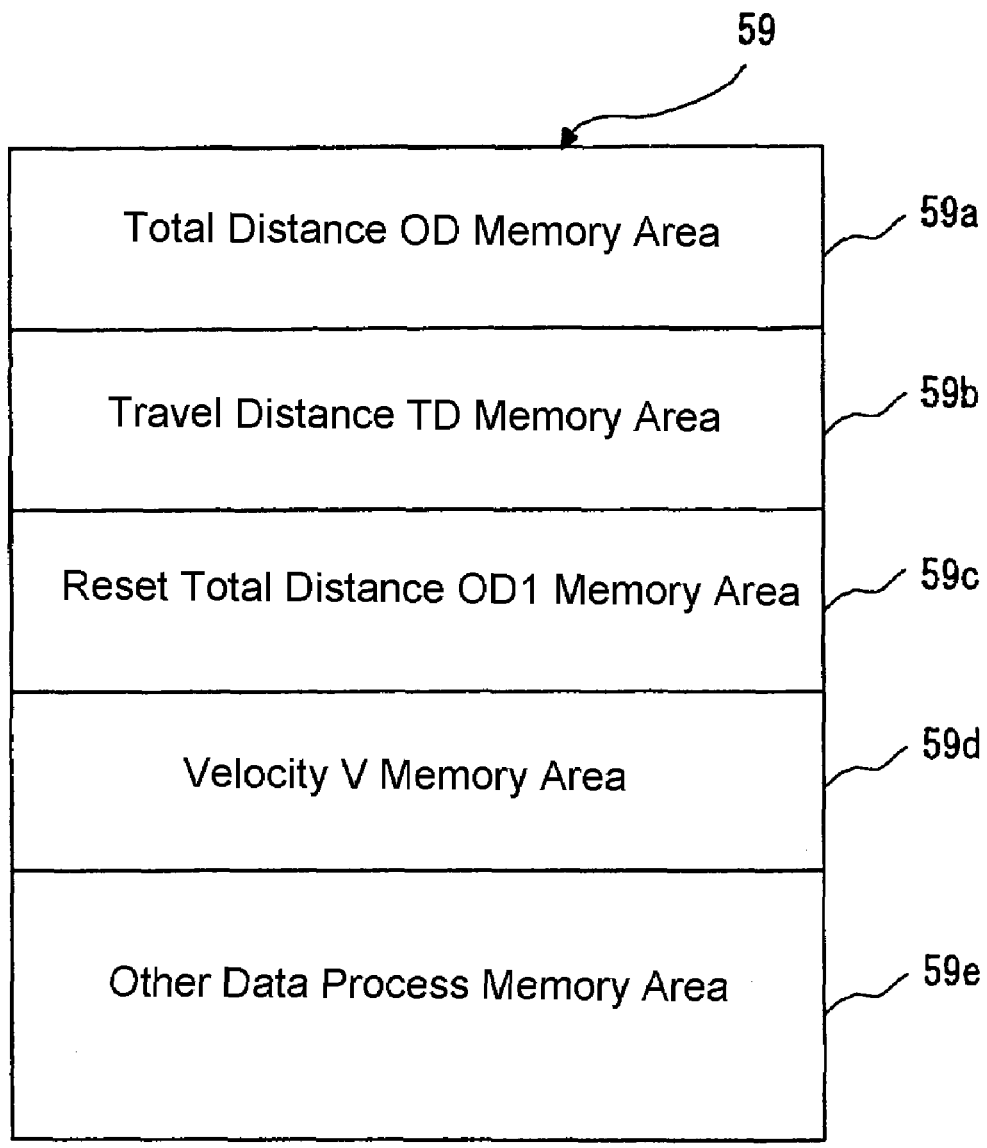
FIG. 9 is a block diagram of a particular embodiment of contents of a memory component.

Second memory component 59 may store travel information such as travel distance, total distance(in such cases it functions as a cumulative information memory), travel time, and so on. In this embodiment, second memory component 59 comprises a nonvolatile memory such as an EEPROM so that the various types of data may be retained even when the power source is interrupted as a result of third control unit 32 being detached from second control unit 31. As shown in FIG. 9, second memory component 59 may be divided into a total distance (OD) memory area 59a for storing total distance OD output from first control portion 35, a travel distance (TD) memory area 59b for storing travel distance TD since reset, a reset total distance (OD1) memory area 59c for storing the total distance OD at reset, a velocity (V) memory area 59d for storing changes in the time of the velocity V to display average velocity, maximum velocity, or the like, and a data memory area 59e for storing other data.

Returning again to first control unit 30, second power storage element 38b is connected to first power storage element 38a through a diode 42. Diode 42 causes electrical current to flow in one direction only from first power storage element 38a to second power storage element 38b. In other words, diode 42 prevents reverse current flow from second power storage element 38b to first power storage element 38a. In this embodiment, first power storage element 38a is employed mainly as a power supply for electrical components with high power consumption and high electrical capacity, such as drivers 39f, 39r, 43f and 43r, whereas second power storage element 38b is employed as a power supply for electrical components having low power consumption and low electrical capacity, such as first control portion 35, third control portion 55, and LCD 56. First and second power storage elements 38a and 38b may comprise high-capacity capacitors, such as electric double layer capacitors. These capacitors store direct current power output from alternating current generator 19 and rectified by charging control circuit 33. Of course, instead of capacitors, first and second power storage elements 38a and 38b could comprise secondary cells, such as nickel-cadmium, lithium ion, or nickel hydrogen cells.

Charging control circuit 33 comprises a rectifier circuit 37 and a charge on/off switch 40. Rectifier circuit 37 rectifies current output from alternating current generator 19 to produce DC current, and charge on/off switch 40 switches on and off the current output by the rectifier circuit 37 in response to control signals from first control portion 35. More specifically, first control portion 35 monitors the voltage of first power storage element 38a. Below a predetermined voltage (e.g., 5.5V), first control portion 35 outputs a control signal for switching on the charge on/off switch 40, thus allowing first power storage element 38a to charge. On the other hand, if the voltage of first power storage element 38a goes above a predetermined voltage (e.g., 7 V), first control portion 35 outputs a control signal for switching off the charge on/off switch 40, thereby preventing excessive voltage from accumulating in first power storage element 38a.

Power on/off switch 28 is connected to first power storage element 38a and to first control portion 35. Power is switched on to activate second control portion 45 and FSD 43f when it is necessary to adjust front suspension 13f, but power is switched off otherwise. As a result, needless power consumption from first power storage element 38a can be avoided.

Power supply and communications circuit 34 is connected to second storage element 38b and to first control portion 35. As noted above, power supply and communications circuit 34 switches on and off a relatively low current signal from second power storage element 38b to second control unit 31 and third control unit 32 and provides composite power/control signals to second control unit 31 and third control unit 32, thus functioning as an information output. It does this through a single communication line 52 to reduce components. Power supply and communications circuit 34 is controlled in response to information such as velocity, distance traveled, current transmission gear, automatic vs. manual modes, suspension hardness and the like.

As shown in FIG. 4, first receiver circuit 46 in second control unit 31 is connected to power supply and communication circuit 34 through communication line 52, thus functioning as an information input. First receiver circuit 46 extracts the control signals from the composite power/control signals from power supply and communication circuit 34 and communicates the control signals to second control portion 45. Third power storage element 38c also is connected to power supply and communications circuit 34. Third power storage element 38c may comprise, for example, a relatively high capacity capacitor such as an electrolytic capacitor, and it is provided to smooth the electrical current from the composite power/control signals received from power supply and communications circuit 34. Third power storage element 38c provides operating power to buffer 48 that functions to stabilize the analog voltage signals from shift switches 20a-20db and control switches 21a and 21b.

Second receiver circuit 61 and fourth power storage element 38d in third control unit 32 also are connected to power supply and communication circuit 34 (in parallel with first receiver circuit 46). Second receiver circuit 61 extracts the control signals from the composite power/control signals from power supply and communication circuit 34, thus functioning as an information input, and communicates the control signals to third control portion 55. Fourth power storage element 38d may comprise an electrolytic capacitor that provides operating power directly to third control portion 55 and indirectly to backlight 58 through voltage stabilizing circuit 57. Voltage stabilizing circuit 57 stabilizes the voltage from fourth power storage element 38d to avoid flickering of backlight 58 that otherwise may be caused by the pulsed control signals superimposed on the power signals from power supply and communications circuit 34.

Figure 5:
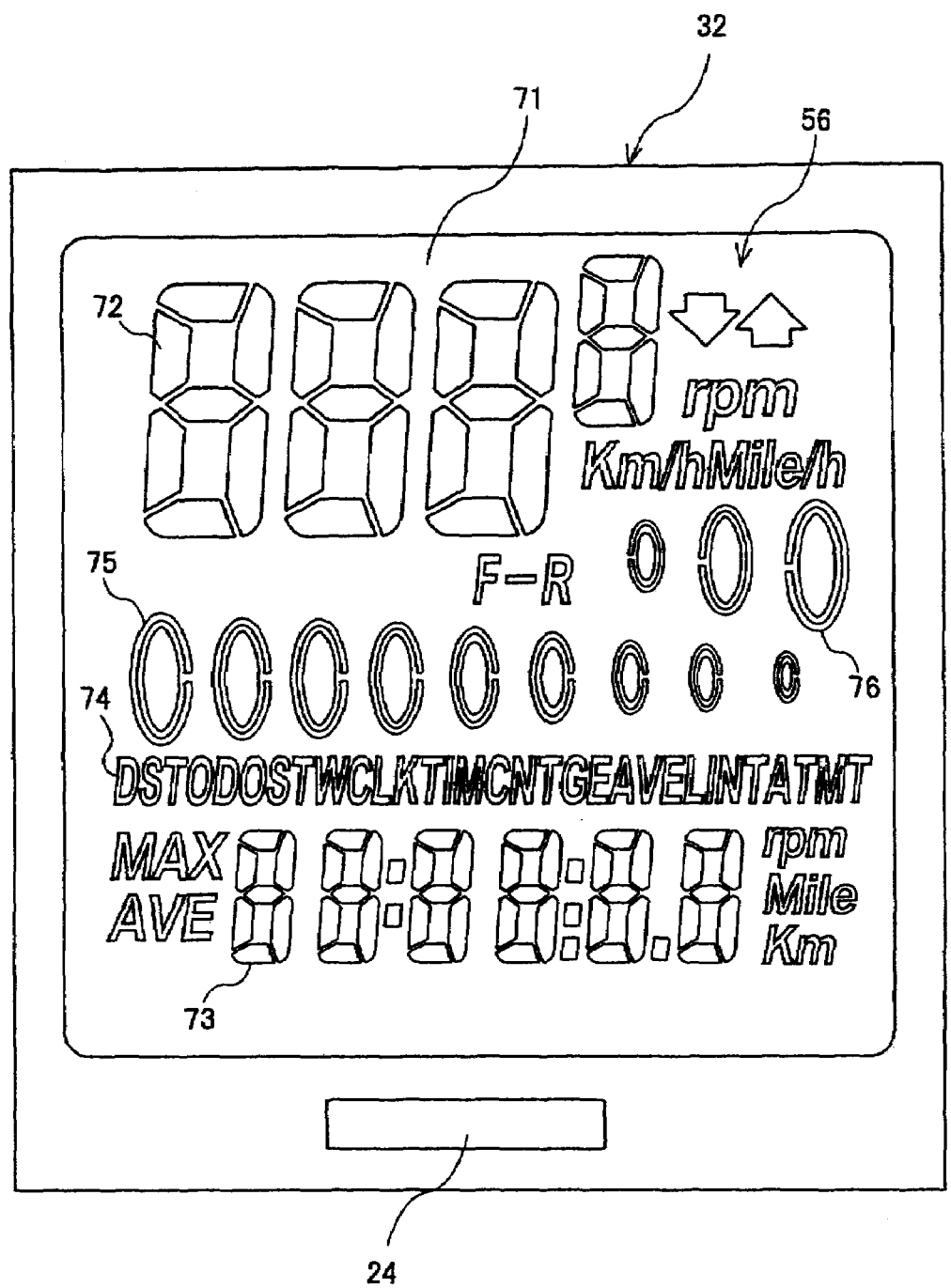
FIG. 5 is an illustration of items displayed on the computer display.

FIG. 5 illustrates an embodiment of information that may be shown on a display screen 71 of LCD 56. In this embodiment, display screen 71 comprises a main number display portion 72, an auxiliary number display portion 73, a description display portion 74, a rear gear position display portion 75, and a front gear position display portion 76. Information such as bicycle velocity, time, etc. is displayed in numerical format in main number display portion 72 and auxiliary number display portion 73. Description display portion 74 displays a description of the contents of main number display portion 72 and auxiliary number display portion 73, as well as showing the transmission operating mode. For example, "VEL" indicates travel velocity, "DST" indicates distance traveled, "CLK" indicates current time, "TIM" indicates travel time, and "GEA" indicates current shift position of the front and rear transmissions, "AT" indicates automatic shift mode, "MT" indicates manual shift mode, and so on. The unit of velocity can be switched between "Km/h" and "Mile/h", and the unit of distance can be switched between "Km" and "Mile."

The rear gear position display portion 75 shows the gear position of the rear transmission 9, and it comprises a plurality of (e.g., nine) elliptical display symbols gradually decreasing in diameter from left to right to correspond with the size of the actual rear sprockets R1-R8. When initializing LCD 56, the number of sprockets for rear transmission 9 can be set to match the actual number of sprockets installed on the bicycle. For example, when rear transmission 9 has eight sprockets, as in this embodiment, the number of rear sprockets is input to the cycle computer. Thereafter, eight elliptical display symbols are displayed from left to right in rear gear position display portion 75, with the one remaining symbol at the right end not displayed. Similarly, the front gear position display portion 76 shows the gear position of the front transmission 8, and it comprises a plurality of (e.g., three) elliptical display symbols gradually increasing in diameter from left to right to correspond with the size of the actual front sprockets F1-F3. When initializing LCD 56, the number of sprockets for front transmission 8 can be set to match the actual number of sprockets installed on the bicycle. For example, when front transmission 8 has two sprockets, the number of front sprockets is input to the cycle computer. Thereafter, two elliptical display symbols are displayed from right to left in front gear position display portion 76, with the one remaining symbol at the left end not displayed. As a result of this arrangement, the sprocket positions of front and rear transmissions 8 and 9 may be ascertained intuitively at a glance.

In operation, the alternating current generator 19 of hub dynamo 10 generates electricity as the bicycle is pedaled, and this electricity is supplied to first control unit 30, with power being stored by first and second power storage elements 38a and 38b. Since alternating current generator 19 is disposed on rear wheel 7, first and second power storage elements 38a and 38b can be charged simply by turning the pedals, with the bicycle remaining stationary, by lifting the rear wheel. Thus, it is a simple matter to at least partially charge first and second power storage elements 38a and 38b by turning the pedals to allow setting up of the electronically operated transmissions and the information displayed on LCD 56.

In automatic shift mode, derailleurs 26f and 26r and suspensions 13f and 13r are controlled according to a velocity signal generated by first control portion 35 from the shaped pulse output by waveform shaping circuit 36. More specifically, a shift operation is performed when the bicycle velocity is greater or less than predetermined values, wherein rear derailleur 26r is given preference in ordinary shift operations. Also, when velocity goes above a predetermined value, the hardness of the suspensions 13f and 13r is increased. Meanwhile, first control portion 35 calculates total distance OD from the shaped pulse output by waveform shaping circuit 36 and stores the result in first memory component 47. Total distance OD may be calculated by counting the shaped pulses, dividing the sum by the number of pulses per wheel rotation, and multiplying the quotient by the wheel circumference. Other cumulative information may be calculated as appropriate.

Control signals based on information such as velocity, distance, transmission gear, automatic vs. manual modes, suspension hardness, and the like, are generated by first control portion 35 and output to power supply communications circuit 34. Power supply and communications circuit 34 superimposes the control signals on a power signal derived from second power storage element 38b to produce the appropriate PCM signals. The composite power/control signals are then communicated to second control portion 45 and third control portion 55, whereupon the composite power/control signals are decoded.

Second control portion 45 is powered by power signals received from power on/off switch 28 and outputs to RSD 43f signals for controlling front suspension 13f in response to the control signal portion of the composite power/control signals received from power supply and communications circuit 34. The power signal portion of the composite power/control signals received from power supply and communications circuit 34 powers buffer amp 48. When a control switch 21a or 21b or a shift switch 20a-20d is operated, a signal of different analog voltage is output to first control portion 35 via buffer amp 48, and first control portion 35 generates the appropriate control signals for controlling one or more of derailleurs 26f and 26r or suspensions 13f and 13r, or for changing the transmission operating mode.

Third control portion 55 is powered by the power signal portion of the composite power/control signals received from power supply and communications circuit 34. Third control portion 55 performs distance calculations and the like based on the control signal portion of the composite power/control signals received from power supply and communications circuit 34 and thereafter outputs to LCD 56 velocity and other kinds of information.

When driving a motor-driven electrical component having large electrical capacity, such as derailleurs 26f and 26r or suspensions 13f and 13r, there is a voltage drop in first power storage element 38a. If first control portion 35, third control portion 55 and LCD 56 were powered by first power storage element 38a, the voltage drop could cause the microprocessors and other electronics to reset or cause some other problem. Since the power for these components in this embodiment is provided from second power storage element 38b connected to first power storage element 38a through diode 42, the components are unaffected by voltage drops in first power storage element 38a. While second control portion 45 is powered by first power storage element 38a, it is normally off except when needed to control front suspension 13f. Consequently, second control portion 45 is unaffected by voltage drops in first power storage element 38a.

Figure 6:
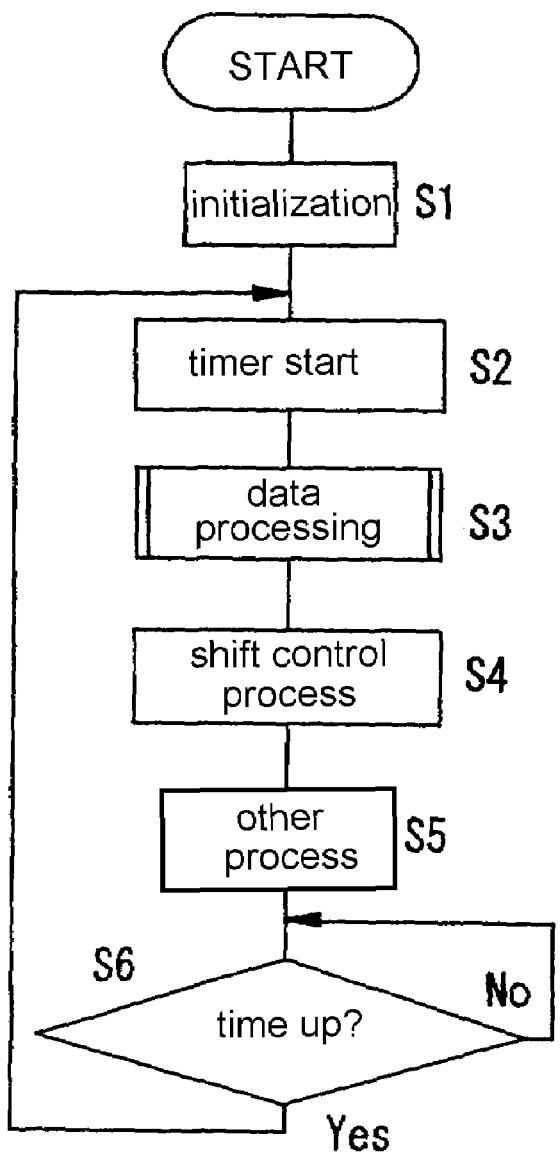
FIG. 6 is a flow chart of a particular embodiment of a main processing routine in a first control unit.

More specific operations of first control unit 30 and third control unit 32 now will be described with reference to FIGS. 6-8. FIG. 6 is a flow chart of a particular embodiment of a main processing routine in first control unit 30. When rear wheel 7 turns, alternating current generator 19 supplies electrical power to first control unit 30, and this power is stored in first power storage element 38a and second power storage element 38b. The power stored in second power storage element 38b is supplied to first control portion 35, and initialization of first control portion 35 is carried out in Step S1 of FIG. 6. In this initialization process, the transmission operating mode may be set to automatic shift mode, for example.

In Step S2, a timer that measures the processing time per microcomputer processing cycle is started. In Step S3, a data processing routine shown in FIG. 7 is performed for computing total distance and the like. In Step S4, a shift control process (automatic or manual) is executed in a manner described above. In Step S5, another process such as the establishment of the operating mode is executed. In Step S6, the process waits for the started timer to stop. When that occurs, the routine returns to Step S2.

Figure 7:
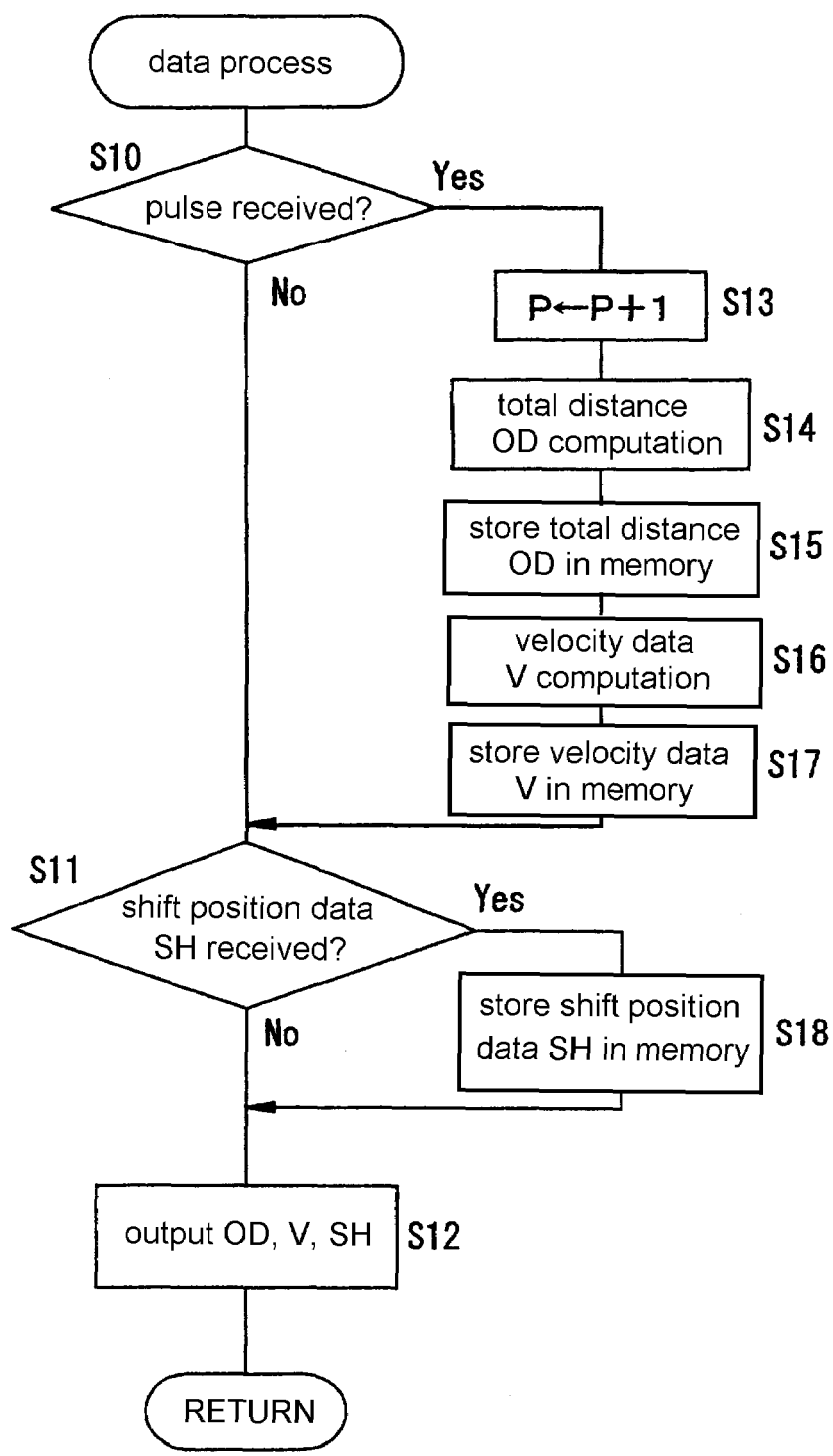
FIG. 7 is a flow chart of a particular embodiment of a data processing routine.

FIG. 7 is a flow chart of a particular embodiment of the data processing routine. It is first determined in Step S10 whether or not a pulse from the waveform shaping circuit 36 has been received. If so, a pulse count is incremented in Step S13, total distance OD is computed from the pulse count as described above in Step S14, the computed total distance OD is stored as the most recent total distance in first memory component 47 in Step S15, velocity data V is computed from the pulses output by waveform shaping circuit 36 in Step S16, and the computed velocity data V is stored in first memory component 47 in Step S17. Storing these values allows the most recent data to be output despite differences between computation timing and output timing.

In any event, it is then determined in Step S11 whether or not shift position data SH from the operating position sensors 41r and/or 41f has been received. If so, the data is converted to shift position data SH for display and is stored in first memory component 47 in Step S18. Thereafter, the total distance OD, velocity data V, shift position data SH and the like are output through communication line 52 to third control unit 32 for display.

Figure 8:
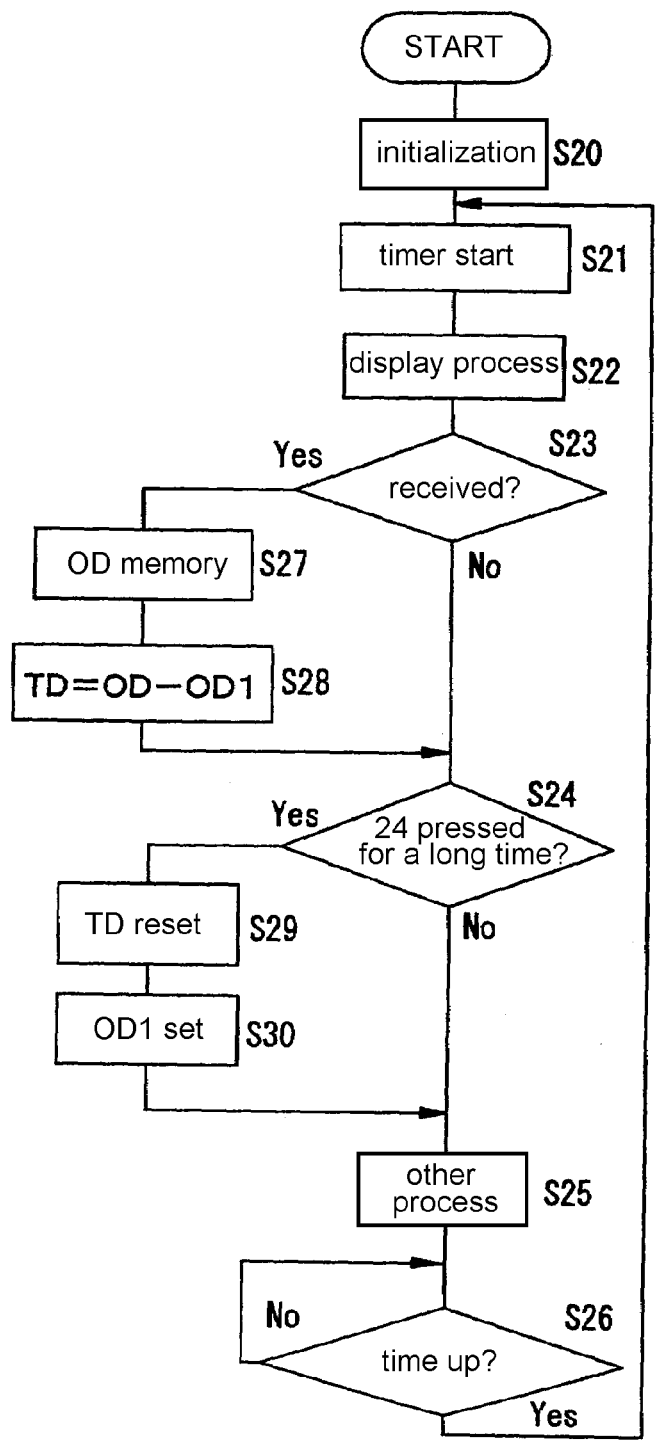
FIG. 8 is a flow chart of a particular embodiment of a main processing routine in a third control component.

FIG. 8 is a flow chart of a particular embodiment of a main processing routine in third control unit 32. When power is supplied from second storage element 38b through communication line 52, third control portion 55 in third control unit 32 performs initialization in Step S20. In this initialization process, the units for distance or velocity may be set, for example. In Step S21, a timer that measures the processing time per microcomputer processing cycle of the third control portion 55 is started. In Step S22, a display process is performed to display velocity, distance, front and rear shift positions, and other data as appropriate. In this embodiment, either travel distance TD or total distance OD is selected for display on the auxiliary number display portion 73 in response to the operation of mode switch 24, thus allowing the display area to be more compact.

It is then determined in Step S23 whether or not velocity V or total distance OD data has been received from first control portion 35 through communication line 52. If so, the received total distance OD is stored in the total distance OD memory area 59a of second memory component 59 in Step S27. Then, in Step S28, the reset total distance OD1 stored in the reset total distance OD1 memory area 59c is subtracted from the stored total distance OD to compute the travel distance TD, and the travel distance is then stored in the travel distance TD memory area 59b of second memory component 59. The total distance OD or travel distance TD is displayed at the next occurrence of the display process in Step S22.

In any event, it is determined in Step S24 whether or not mode switch 24 has been pressed for a long time (thereby functioning as a start input component). If so, the travel distance TD stored in the travel distance TD memory area 59b is reset to 0 in Step S29, and the current total distance OD is stored as the reset total distance OD1 in the reset total distance OD1 memory area 59c, in which case reset total distance OD1 functions as reference cumulative information and reset total distance OD1 memory area 59c functions as a reference information memory. Storing the reset total distance OD1 as reference cumulative information allows the travel distance TD to be accurately calculated from a subsequently received total distance OD even when the power source is interrupted, such as when third control unit 32 is detached from second control unit 31.

In any event, another process such as one triggered by a normal operation of mode switch 24 is executed in Step S25. Then, the process waits in Step S26 for the timer started in Step S21 to stop. When that occurs, the routine returns to Step S21.

It should be readily apparent that the total distance OD is constantly computed by first control portion 35 of first control unit 30, which tends to be more permanently mounted on the bicycle, and the computed total distance OD is displayed on LCD 56 in third control unit 32. In other words, the total distance OD is not computed by third control unit 32 at the display end of the cycle computer, but is computed by first control unit 30, which is separate from the display end. As such, the total distance OD can be properly displayed even when third control unit 32 is replaced. Furthermore, when a plurality of bicycles are owned, the total distances of each of the several bikes can be properly displayed with just one third control unit 32. The total distance also can be properly displayed when third control unit 32 is mounted, regardless of whether or not it was temporarily detached.

While the above is a description of various embodiments of inventive features, further modifications may be employed without departing from the spirit and scope of the present invention. For example, in the above embodiment, first control unit 30 computed the total distance, and the total distance was output to third control unit 32. Alternatively, total distance could be calculated by another component, such as second control unit 31 or some other control unit to which third control unit 32 could be attached.

In the above embodiment, wheel rotation information was used to calculate velocity and distance, but such data also could be calculated from rotation information from the pulley of the rear derailleur 26r or crank 27. If so, wheel rotation information could be derived from this information plus shift position information.

In the above embodiment, bicycle velocity was derived from signals produced by alternating current generator 19, which obviates the need for a dedicated rotation information output component. The use of alternating current generator 19 in this manner also allows a plurality of signals to be obtained per revolution of the wheel which, in turn, produces a more precise computation of total distance. However, bicycle velocity could be derived from signals produced by conventional velocity sensors comprising a reed switch and one or more magnets that detect wheel rotation.

In the above embodiment, the travel distance from a starting point was computed, but the remaining travel distance also may be computed and displayed when the travel distance is known in advance such as during training or touring. Such cases may include a reference information input component (such as mode switch 24) for inputting reference information such as a target travel distance; and a remaining distance computation component (such as third control portion 55) for computing the remaining travel distance by subtracting the computed travel distance from the input target travel distance. For example, a step for inputting the target travel distance can be inserted after the display process in Step S22, the travel distance TD can be computed in Step S28 for each signal received in Step S23, and the computed travel distance TD then can be subtracted from the input target travel distance to compute the remaining travel distance. The remaining travel distance or the target travel distance also may be reset in Step S29 in the same manner as for the travel distance TD.

In the above embodiment, first control unit 30, second control unit 31 and third control unit 32 were operatively coupled by wiring them together, but any of them may be operatively coupled by a wireless communication arrangement.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle display apparatus that displays cumulative information produced from a bicycle-related running condition, wherein the apparatus comprises:
a computing component that calculates the cumulative information, wherein the computing component is structured for attachment to the bicycle, and wherein the computing component includes an information output component for outputting the calculated cumulative information;
a separate display component housed within a case member and including an information input component that receives the cumulative information calculated by the computing component, wherein the display component displays the cumulative information calculated by the computing component;
wherein the computing component is disposed outside of the case member and is structured to be mounted to the bicycle independently of the display component; and
wherein the display component is structured to be detachably attached to the bicycle independently of the computing component so that the computing component may remain attached to the bicycle after the display component is removed.

2. The apparatus according to claim 1 wherein the computing component comprises a cumulative information memory disposed outside of the case member for periodically storing the cumulative information calculated by the computing component.

3. The apparatus according to claim 1 wherein the computing component is structured for attachment to the bicycle spaced apart from the case member.

4. The apparatus according to claim 1 wherein power is communicated from the computing component to the display component through the information output component and the information input component.

5. The apparatus according to claim 4 wherein the power and the information calculated by the computing component are communicated from the computing component to the display component through a single communication line.

6. The apparatus according to claim 5 wherein the power and the information calculated by the computing component are communicated from the computing component to the display component in one way only through the communication line.

7. The apparatus according to claim 1 wherein the computing component uses rotation information from a rotating member on the bicycle to calculate the cumulative information.

8. The apparatus according to claim 7 wherein the rotation information comprises rotation of a bicycle wheel.

9. The apparatus according to claim 8 wherein the rotation information comprises signals from an alternating current generator that rotates with the bicycle wheel.

10. The apparatus according to claim 7 wherein the cumulative information comprises a total distance traveled by the bicycle.

11. The apparatus according to claim 1 wherein the display component comprises a start input component for initiating computation of additional cumulative information.

12. The apparatus according to claim 11 wherein the display component further comprises a cumulative information memory housed within the case member for storing the cumulative information communicated from the computing component.

13. The apparatus according to claim 12 wherein the display component stores the cumulative information communicated from the computing component in the cumulative information memory as reference cumulative information in response to operation of the start input component.

14. The apparatus according to claim 13 wherein the display component calculates additional cumulative information using the reference cumulative information and subsequent cumulative information communicated from the computing component.

15. The apparatus according to claim 14 wherein the display component is structured to display the additional cumulative information.

16. The apparatus according to claim 15 wherein the display component is structured to display the cumulative information communicated from the computing component.

17. The apparatus according to claim 16 wherein display component further comprises a display switching component for alternately displaying the cumulative information communicated from the computing component and the additional cumulative information.

18. The apparatus according to claim 1 further comprising a second computing component that calculates and displays information on the display component.

19. The apparatus according to claim 18 wherein the second computing component is disposed within the case member.

20. The apparatus according to claim 18 wherein the second computing component receives data from the computing component through the information input component and calculates the information displayed on the display component from the data received from the computing component through the information input component.

21. The apparatus according to claim 18 wherein the information input component is physically detachable from the information output component.

22. The apparatus according to claim 1 wherein the information input component is physically detachable from the information output component.

23. The apparatus according to claim 22 wherein power is communicated from the computing component to the display component through the information output component and the information input component.

24. The apparatus according to claim 1 wherein the case member is mounted to a bracket that is structured to be mounted to a bicycle handlebar.

25. The apparatus according to claim 24 wherein the case member is structured to be detachable from the bracket so that the information output component is physically detachable from the information input component.

26. The apparatus according to claim 1 wherein the computing component comprises a cumulative information memory disposed outside of the case member for periodically storing the cumulative information calculated by the computing component, and further comprising a second computing component that calculates and displays information on the display component, wherein the second computing component is disposed within the case member.

27. The apparatus according to claim 26 wherein the cumulative information comprises total distance traveled by the bicycle.

\* \* \* \* \*